United States Patent
Ito

(10) Patent No.: US 6,425,569 B1
(45) Date of Patent: Jul. 30, 2002

(54) GATE VALVE

(75) Inventor: Ichio Ito, Tokyo (JP)

(73) Assignee: V Tex Corporation, Tokyo (JP)

( * ) Notice: Subject to any disclaimer, the term of this patent is extended or adjusted under 35 U.S.C. 154(b) by 0 days.

(21) Appl. No.: 09/707,654

(22) Filed: Nov. 7, 2000

(30) Foreign Application Priority Data

Dec. 28, 1999 (JP) .......................................... 11-373921

(51) Int. Cl.⁷ .............................................. F16K 25/00
(52) U.S. Cl. ....................................... 251/158; 251/193
(58) Field of Search ................................. 251/158, 326, 251/328, 329, 193

(56) References Cited

U.S. PATENT DOCUMENTS

| | | | |
|---|---|---|---|
| 855,350 A | * 5/1907 | Singmaster | ................. 251/158 |
| 3,120,944 A | 2/1964 | Cogez et al. | |
| 4,560,141 A | 12/1985 | Bosch | |
| 4,721,282 A | 1/1988 | Shawver et al. | |
| 5,002,255 A | 3/1991 | Sawa et al. | |
| 5,120,019 A | 6/1992 | Davis, Jr. | |
| 5,415,376 A | 5/1995 | Ito | |
| 5,641,149 A | 6/1997 | Ito | |
| 6,056,266 A | * 5/2000 | Blecha | ....................... 251/158 |

FOREIGN PATENT DOCUMENTS

JP 07083336 3/1995

* cited by examiner

*Primary Examiner*—Kevin Lee
(74) *Attorney, Agent, or Firm*—Nilles & Nilles, S.C.

(57) ABSTRACT

A gate valve including a valve disc for opening and closing an opening formed in a partition wall for separating a processing chamber from an other chamber, a valve seat formed on the wall around the opening, and a block provided on a side surface of the valve disc facing the processing chamber for filling up the opening. The valve disc is moved selectively brought into contact with the valve seat. When the opening is closed by the valve disc the block is positioned in the opening to close the opening, and when the opening is not closed by the valve disc the block is not positioned in the opening. A gate valve includes a valve disc for opening and closing one side of an opening formed in a partition wall for separating a processing chamber from an other chamber, a valve seat formed on one side surface of the wall around the opening, a closing member for opening and closing the other side of the opening, and a groove formed in the wall for receiving therein the closing member. The valve disc and the closing member are moved selectively to a position where the valve disc is brought into contact with the valve seat and the closing member is positioned in the opening at the other side surface of the wall facing the processing chamber to close the opening, and a position where the valve disc is separated from the valve seat and the closing member is inserted into the groove.

5 Claims, 8 Drawing Sheets

F I G. 2
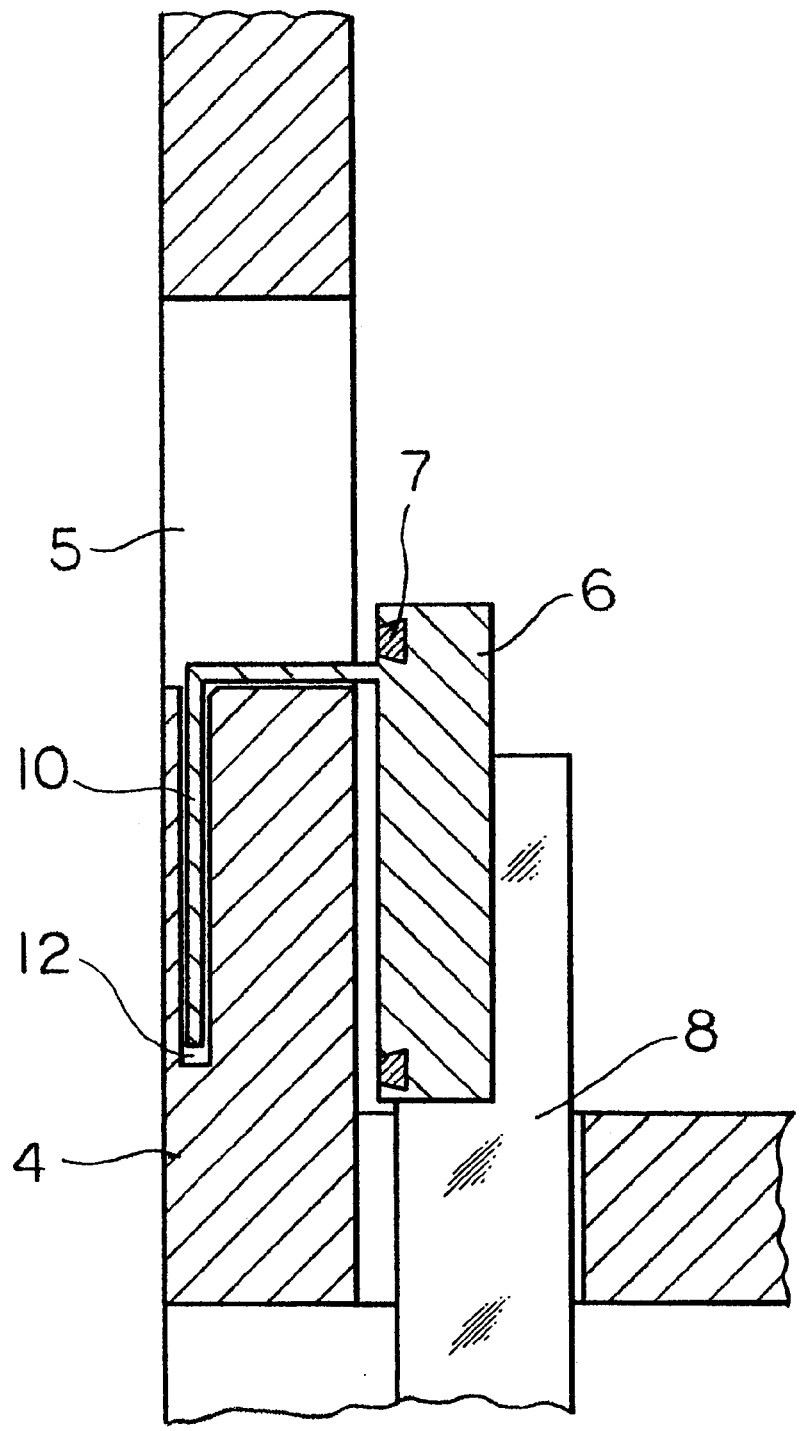

F I G. 4
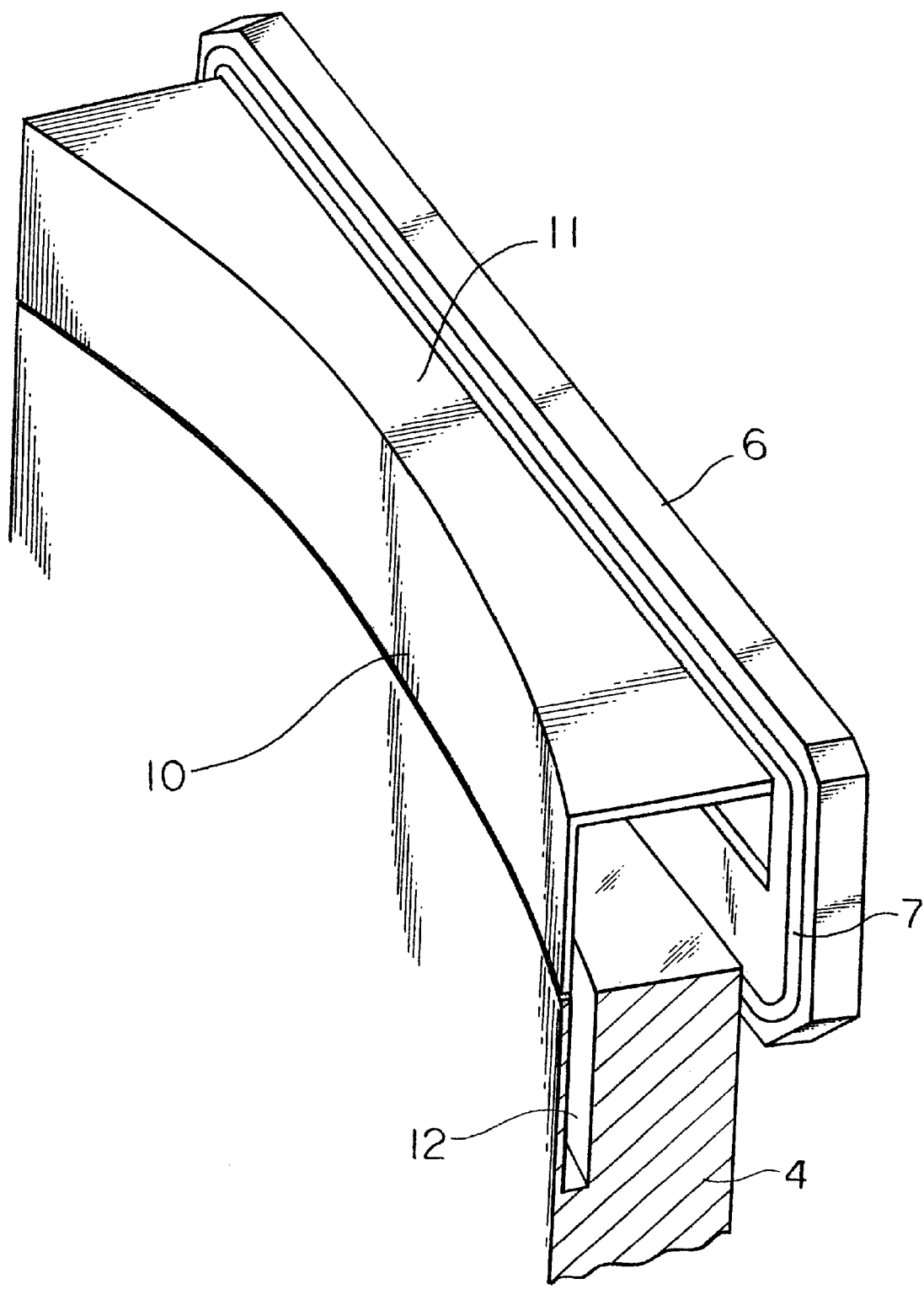

GATE VALVE

BACKGROUND OF THE INVENTION

1. Field of the Invention

The present invention relates to a gate valve and more particularly to a gate valve for use in a processing device for processing a semiconductor wafer or the like.

2. Description of the Prior Art

In a processing device for processing a semiconductor wafer, a liquid crystal substrate or the like to be processed, the wafer or the like is inserted into or taken out from a processing chamber through an opening formed in a wall of the processing chamber having a gate valve.

Such gate valve is described in U. S. Pat. No. 5,120,019.

FIG. 9 shows an essential portion of a conventional semiconductor wafer manufacturing apparatus. A reference numeral 1 denotes a processing chamber, 2 denotes a semiconductor wafer or the like to be processed in the processing chamber 1, 3 denotes a transfer chamber for transferring the semiconductor wafer 2 into the processing chamber 1, 4 denotes a partition wall having a thickness of 20 mm, for example, for separating both chambers 1 and 3, 5 denotes a rectangular opening having a length of about 50 mm and a width of about 230 mm formed in the wall 4, through which the wafer 2 is transferred, 6 denotes a rectangular plate —like valve disc for opening and closing the opening 5 arranged in the transfer chamber 3 so as to face to a valve seat formed on the wall 4 around the rectangular opening 5 through an O-ring 7 provided on the valve disc 6, 8 denotes a valve rod connected to the valve disc 6 for moving the valve disc 6 in a horizontal direction, for example, so that the valve disc 6 is brought into engagement with the valve seat through the O-ring 7 or disengagement with the valve seat, and for moving up and down or in a direction normal to the horizontal direction when the valve disc 6 is separated from the valve seat, and 9 denotes a current of corrosion gas and/or plasma for processing the semiconductor wafer 2 in the processing chamber 1.

When the wafer 2 is processed in such processing chamber 1, the opening 5 is closed by the valve disc 6 positioned in the transfer chamber 3, so that a space or concave portion corresponding to the thickness of the wall 4 is formed in the opening 5. Accordingly, the current 9 of the gas and/or plasma in the processing chamber 1 is disturbed by the concave portion as a current 9' shown in FIG. 9. This results in the quality of the wafer 2 to be lowered. Further, the seal portion of the valve disc 6 is exposed to the processing chamber 1, so that the seal portion or the O-ring 7 is attacked and polluted by the corrosion gas and/or plasma.

SUMMARY OF THE INVENTION

Accordingly, it is an object of this invention to provide a gate valve free from the above defects.

This invention can be summarized as follows.

A gate valve comprising a valve disc for opening and closing an opening formed in a partition wall for separating a processing chamber from an other chamber, a block provided on a side surface of the valve disc facing the processing chamber for filling the opening, and means for moving the valve disc so that said valve disc is selectively brought into contact with a side surface of the partition wall facing the processing chamber to close the opening, wherein when the opening is closed by the valve disc the block is positioned in the opening, and when the opening is not closed by the valve disc the block is not positioned in the opening.

The invention can also be summarized as follows.

A gate valve comprising a valve disc for opening and closing an opening formed in a partition wall for separating a processing chamber from an other chamber, a closing member for opening and closing one side of the opening facing the processing chamber, a groove formed in the wall for receiving therein the closing member, and means for driving the valve disc and the closing member selectively to a position where said valve disc is brought into contact with a side surface of the partition wall facing said other chamber and said closing member is positioned at the one side of the opening to close the opening, and a position where said valve disc is separated from the partition wall and the closing member is inserted into the groove.

The invention can also be summarized as follows.

A gate valve comprising a valve disc for opening and closing an opening formed in a partition wall for separating a processing chamber from an other chamber, a closing member for opening and closing one side of the opening facing the processing chamber, means for moving the valve disc and the closing member relative to each other, and means for driving the valve disc and the closing member selectively to a position where said valve disc is brought into contact with a side surface of the partition wall facing said other chamber and said closing member is positioned at the one side of the opening to close the opening, and a position where said valve disc is separated from the partition wall and the closing member is moved in the processing chamber.

Said means for moving the valve disc and the closing member relative to each other comprises a bellows one end of which is fixed to the valve disc and the other end of which is connected to the closing member, and means for applying a fluid pressure into the bellows to expand the bellows.

Said side surface of the wall facing the processing chamber is curved, and the closing member and the groove are curved in conformity with the curve of said surface of the wall.

Said side surface of the wall facing the processing chamber is curved, and the closing member is curved in conformity with the curve of said side surface of the wall.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

FIG. 2 is a vertically sectioned front view of the essential portion of the gate valve in accordance with the present invention in an open state;

FIG. 4 is a perspective view of an essential portion of a gate valve of another embodiment of the present invention in a closed state;

DESCRIPTION OF THE PREFERRED EMBODIMENTS

Figure 9:
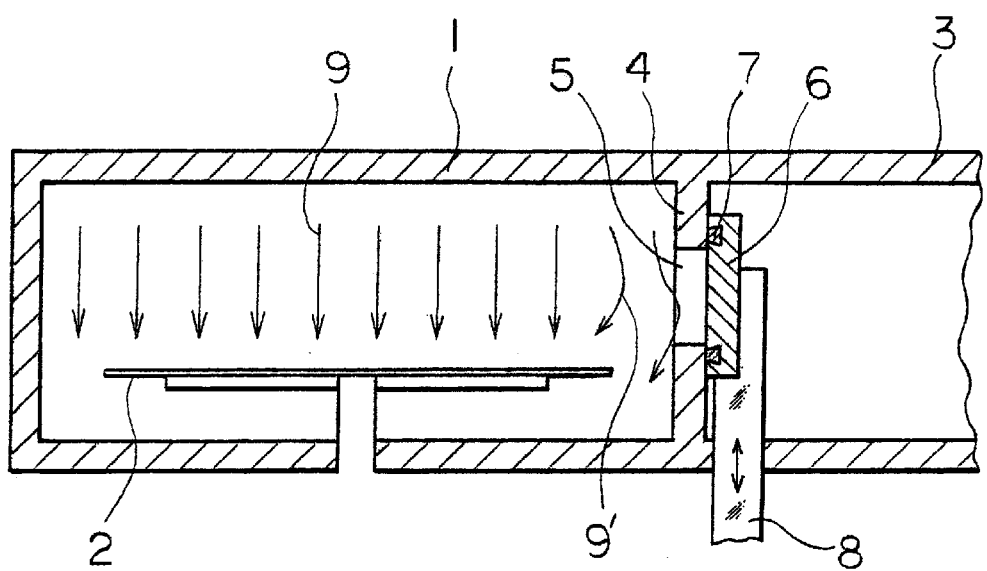
FIG. 9 is a vertically sectioned front view of a conventional processing device for processing a semiconductor wafer.

In the following descriptions, parts of the gate valve of the present invention which are similar to corresponding parts of the gate valve shown in FIG. 9 have been given corresponding reference numerals and need not be further redescribed.

In a first embodiment of the gate valve of the present invention, a block (not shown) in conformity in dimension with the opening 5 is provided for filling the concave portion in the opening 5 on a side surface of the valve disc 6 facing the processing chamber 1.

In this first embodiment, when the valve disc 6 is brought into contact with the valve seat around the opening 5 while inserting the block into the opening 5, the opening 5 is closed by the valve disc 6 and the concave portion in the opening 5 is filled by the block.

Figure 1:
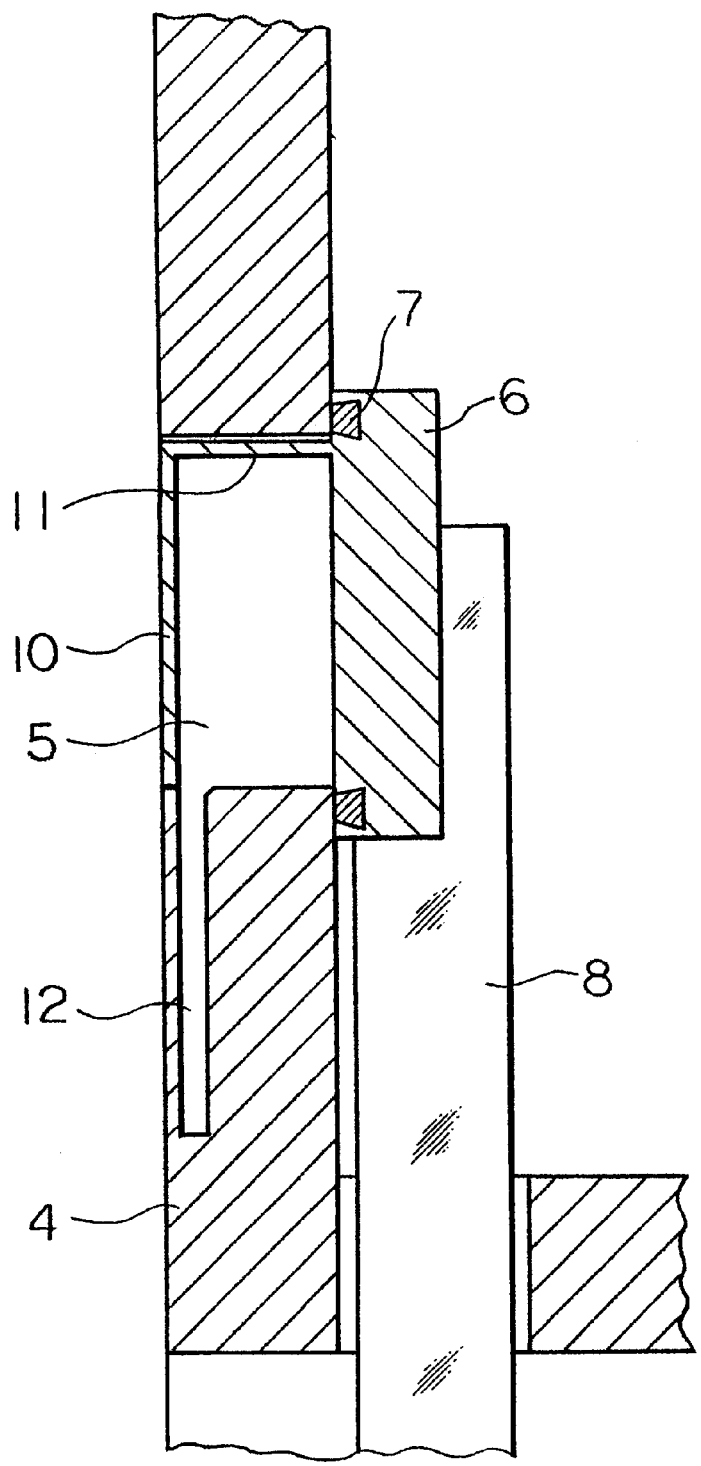
FIG. 1 is a vertically sectioned front view of an essential portion of a gate valve in accordance with the present invention in a closed state.

In a second embodiment of the gate valve in accordance with the present invention, as shown in FIG. 1, a closing plate 10 in conformity in section with the opening 5 in the wall 4 for closing one side of the opening 5 in the wall 4 facing the processing chamber 1 is connected through an arm 11 to the valve disc 6.

Further, a groove 12 having a length and a width corresponding to the length and the thickness of the closing plate 10, respectively, for receiving therein the closing plate 10 is provided in the wall 4 at a position near the processing chamber 1 so as to extend vertically and to open to the opening 5 as shown in FIG. 2.

Figure 3:
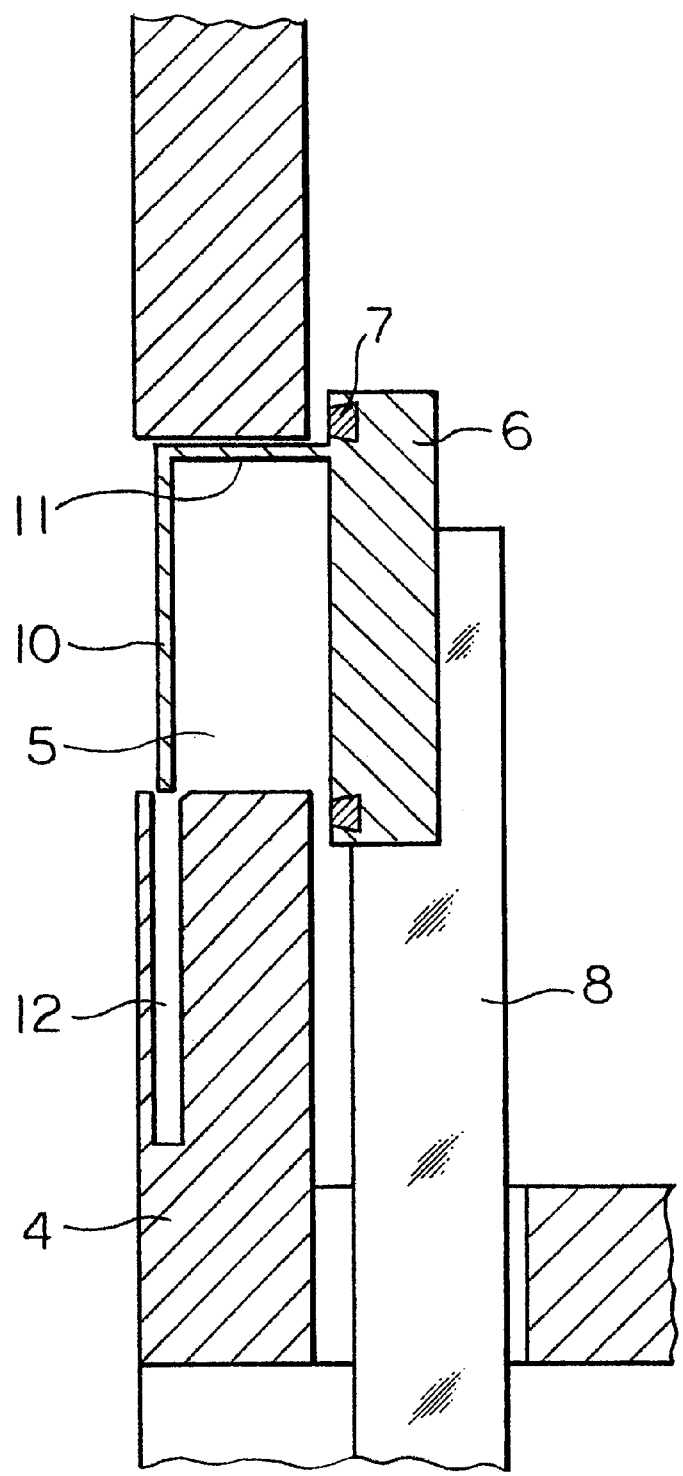
FIG. 3 is a vertically sectioned front view of the essential portion of the gate valve in accordance with the present invention in a state just before the gate valve is opened.

In case that the opening 5 is closed by the valve disc 6 as shown in FIG. 1, the valve disc 6 is lifted through the valve rod 8 by a driving means (not shown) from a position shown in FIG. 2 to a position shown in FIG. 3, and then moved horizontally toward the valve seat on the wall 4 as shown in FIG. 1. In this state shown in FIG. 1, the valve disc 6 is brought into contact with the valve seat around the opening 5, so that the opening 5 is closed by the valve disc 6. At the same time, the closing plate 10 is positioned in the opening 5 so that the one side of the opening 5 facing the processing chamber 1 is closed by the closing plate 10.

In case that the opening 5 is not closed by the valve disc 6 and the closing plate 10, they are moved horizontally so that the valve disc 6 is separated from the valve seat as shown in FIG. 3, and then the valve disc 6 and the closing plate 10 are lowered by the valve rod 8 from the position shown in FIG. 3 to the position shown in FIG. 2. In this state shown in FIG. 2, the closing plate 10 is inserted into the groove 12.

Figure 5:
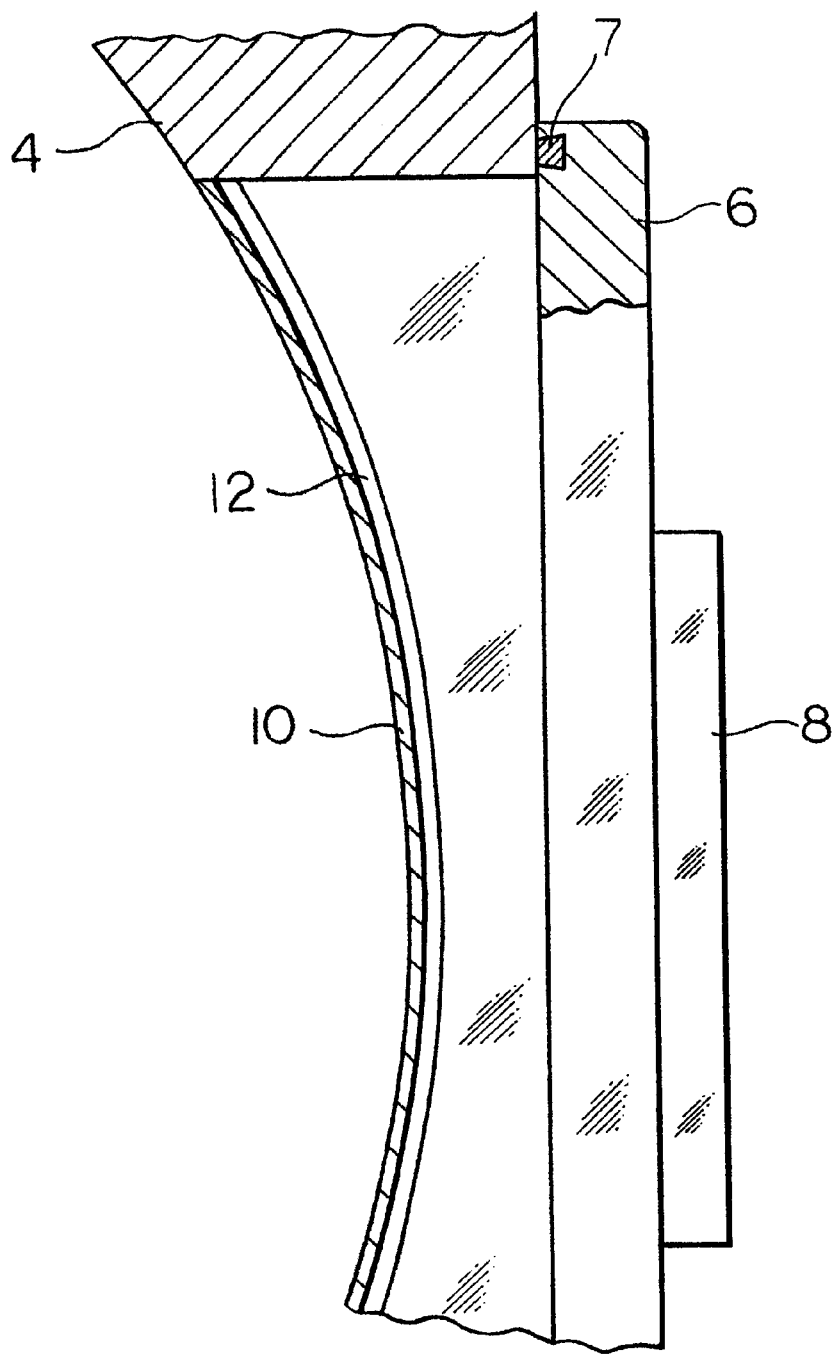
FIG. 5 is a horizontally sectioned plan view of the gate valve shown in FIG. 4.

In a third embodiment of the gate valve according to the present invention, as shown in FIGS. 4 and 5, a side surface of the wall 4 facing the processing chamber 1 is curved and accordingly the closing plate 10 and the groove 12 are also curved in conformity with the curve of the side surface of the wall 4.

Figure 6:
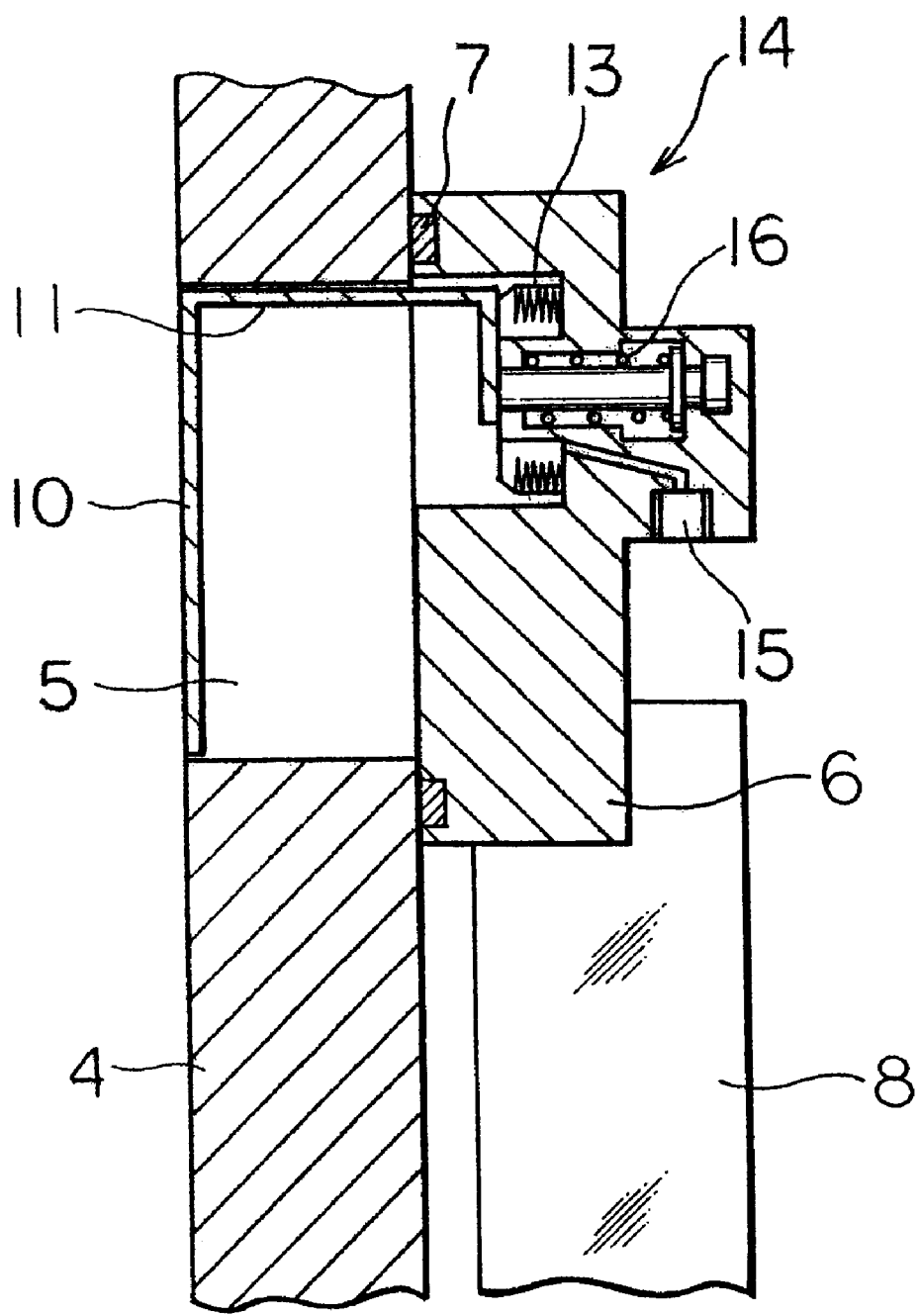
FIG. 6 is a vertically sectioned front view of an essential portion of a gate valve of the other embodiment of the present invention in a closed states.
Figure 7:
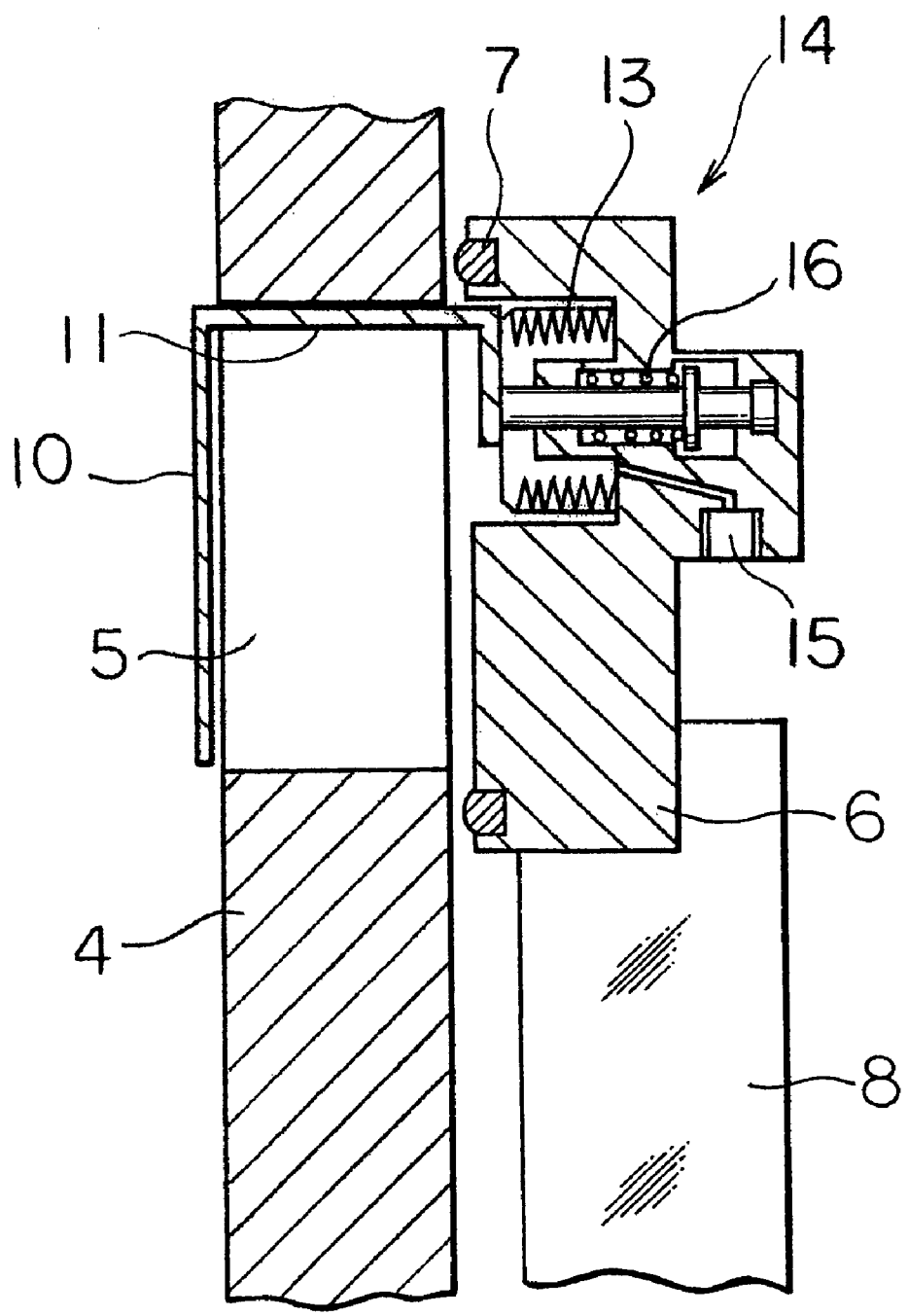
FIG. 7 is a vertically sectioned front view of the gate valve shown in FIG. 6 in a state just before the gate valve is opened.
Figure 8:
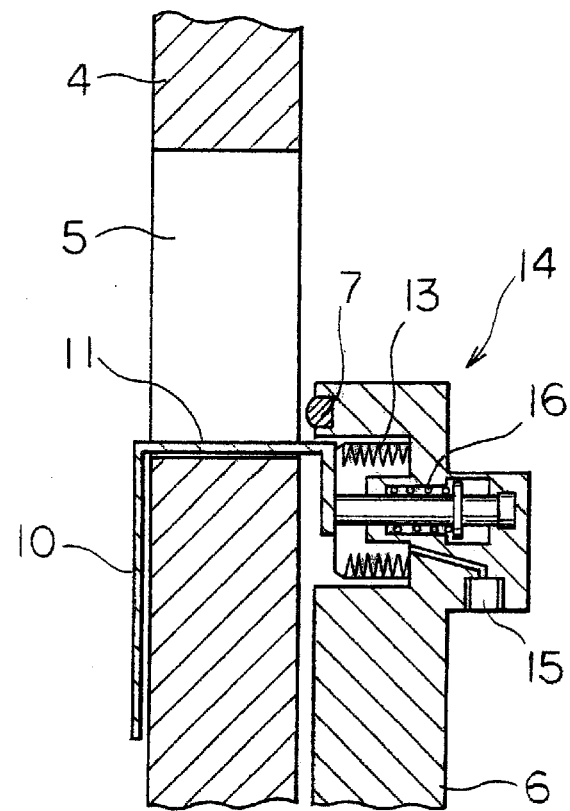
FIG. 8 is a vertically sectioned front view of the gate valve shown in FIG. 6 in an open state.

In a fourth embodiment of the gate valve according to the present invention, no groove 12 is provided as shown in FIGS. 6 to 8.

In this fourth embodiment, further, the closing plate 10 is movable horizontally relative to the valve disc 6 by a moving device 14 having a bellows 13.

In case that the opening 5 is closed, the valve disc 6 is brought into contact with the valve seat around the opening 5 and the bellows 13 in the moving device 14 is compressed by a return spring 16 so that the closing plate 10 is arranged in the opening 5 at the one side thereof, as shown in FIG. 6.

In case that the opening 5 is not closed, the bellows 13 is expanded against the return spring 16 by introducing a fluid pressure into the bellows 13 through a fluid passage 15 so that the closing plate 10 is arranged in the processing chamber 1, and then the valve disc 6 is separated from the valve seat, as shown in FIG. 7. Then, the closing plate 10 and the valve disc 6 are lowered by the valve rod 8 from the position shown in FIG. 7 to the position shown in FIG. 8.

EFFECT OF THE INVENTION

This invention provides important advantages over the conventional gate valve. For example, in the gate valve of the first embodiment of the present invention, the concave portion is filled by the block provided on the side surface of the valve disc, so that the current of the gas or plasma in the processing chamber is not disturbed.

In the second to fourth embodiments of the present invention shown in FIGS. 1 to 8, the concave portion in the opening can be closed by the closing plate 10.

Further, in the fourth embodiment shown in FIGS. 6 to 8, any groove for receiving therein the closing plate can be omitted.

Other objects, features, and advantages of the invention will become more apparent to those skilled in the art from the detailed description and the accompanying drawings.

Many other changes could be made to the invention as described above without departing from the spirit thereof. The scope of these changes will become apparent from the appended claims.

What is claimed is:

1. A gate valve comprising: a valve disc for opening and closing an opening formed in one a partition wall for separating a processing chamber from an other chamber, a closing member for opening and closing one side of the opening, facing the processing chamber a groove formed in the wall for receiving therein the closing member, and means for driving the valve disc and the closing member selectively to a position where said valve disc is brought into contact with a side surface of the partition wall facing said other chamber and said closing member is positioned at the one side of the opening to close the opening, and a position where said valve disc is separated from the partition wall and the closing member is inserted into the groove.

2. A gate valve as defined in claim 1, wherein a side surface of the wall facing the processing chamber is curved, and the closing member and the groove are curved in conformity with the curve of said surface of the wall.

3. A gate valve comprising: a valve disc for opening and closing an opening formed in a partition wall for separating a processing chamber from an other chamber, a closing member for opening and closing one side of the opening facing the processing chamber, means for moving the valve disc and the closing member relative to each other, and means for driving the valve disc and the closing member selectively to a position where said valve disc is brought into contact with a side surface of the partition wall facing said other chamber and said closing member is positioned at the one side of the opening to close the opening, and a position where said valve disc is separated from the partition wall and the closing member is moved in the processing chamber.

4. A gate valve as defined in claim 3, wherein said means for moving the valve disc and the closing member relative to each other comprises a bellows one end of which is fixed to the valve disc and the other end of which is connected to the closing member, and means for applying a fluid pressure into the bellows to expand the bellows.

5. A gate valve as defined in claim 3, wherein a side surface of the wall facing the processing chamber is curved, and the closing member is curved in conformity with the curve of said side surface of the wall.

* * * * *